(12) United States Patent
Du et al.

(10) Patent No.: US 11,881,063 B2
(45) Date of Patent: Jan. 23, 2024

(54) MANAGEMENT APPARATUS FOR A VEHICLE DEVICE, VEHICLE AND SERVER

(71) Applicant: T-MAX (HANGZHOU) TECHNOLOGY CO., LTD., Hangzhou (CN)

(72) Inventors: Xinfa Du, Hangzhou (CN); Xing Fan, Hangzhou (CN); Shaoqi Ma, Hangzhou (CN); Yinghuan Kou, Hangzhou (CN)

(73) Assignee: T-MAX (HANGZHOU) TECHNOLOGY CO., LTD.

( * ) Notice: Subject to any disclaimer, the term of this patent is extended or adjusted under 35 U.S.C. 154(b) by 597 days.

(21) Appl. No.: 16/682,960

(22) Filed: Nov. 13, 2019

(65) Prior Publication Data
US 2020/0265658 A1 Aug. 20, 2020

(30) Foreign Application Priority Data
Feb. 20, 2019 (CN) .......................... 201910125764.6

(51) Int. Cl.
*G07C 5/08* (2006.01)
*H04W 4/40* (2018.01)

(52) U.S. Cl.
CPC ............. *G07C 5/0808* (2013.01); *H04W 4/40* (2018.02)

(58) Field of Classification Search
CPC ......... G07C 5/0808; B66D 1/40; H04W 4/40; B60R 9/02
See application file for complete search history.

(56) References Cited

U.S. PATENT DOCUMENTS

| 634,385 | A | 10/1899 | Wolfe et al. |
| 724,155 | A | 3/1903 | Besse |
| 752,031 | A | 2/1904 | Chadwick |
| 817,224 | A | 4/1906 | Clifford |
| 955,658 | A | 4/1910 | Mitchell et al. |

(Continued)

FOREIGN PATENT DOCUMENTS

| CA | 1021826 | 11/1977 |
| CA | 2082177 | 5/1994 |

(Continued)

OTHER PUBLICATIONS

International Search Report of the International Searching Authority for PCT International Application No. PCT/CN2019/077842 dated Oct. 12, 2019. (English Translation, p. 1-20).

(Continued)

*Primary Examiner* — Calvin Cheung
(74) *Attorney, Agent, or Firm* — Perkins Coie LLP

(57) ABSTRACT

A management apparatus for a vehicle device, a vehicle and a server are provided. The management apparatus includes: a state determining unit, configured to determine a current state of the vehicle device; a first communication module, configured to transmit the current state of the vehicle device to at least one of a mobile terminal and a server and to receive a control instruction generated by the at least one of the mobile terminal and the server according to the current state of the vehicle device; and a controller, configured to control an action-executing unit of the vehicle device according to the control instruction to drive the vehicle device to execute an action.

21 Claims, 6 Drawing Sheets

(56) References Cited

U.S. PATENT DOCUMENTS

| | | |
|---|---|---|
| 1,063,643 A | 6/1913 | Blake et al. |
| 1,169,140 A | 1/1916 | Fassett et al. |
| 1,176,538 A | 3/1916 | Warner |
| 1,182,169 A | 5/1916 | Hansen |
| 1,222,127 A | 4/1917 | Perri |
| 1,239,892 A | 9/1917 | Dunderdale |
| 1,242,828 A | 10/1917 | Lyle |
| 1,250,604 A | 12/1917 | Lorenc |
| 1,268,335 A | 6/1918 | Fairchild |
| 1,364,697 A | 1/1921 | Branch |
| 1,437,648 A | 12/1922 | Gore |
| 1,449,031 A | 3/1923 | Blake |
| 1,471,972 A | 10/1923 | Miller |
| 1,509,235 A | 9/1924 | Giuliani |
| 1,621,479 A | 3/1927 | Cleveland et al. |
| 1,755,942 A | 4/1930 | Woolson |
| 1,800,162 A | 4/1931 | Stroud |
| 2,029,745 A | 2/1936 | Stiner |
| 2,041,640 A | 5/1936 | Goss |
| 2,118,557 A | 5/1938 | Hamilton |
| 2,122,040 A | 6/1938 | Machovec |
| 2,125,085 A | 7/1938 | Pool |
| 2,197,266 A | 4/1940 | Fredell |
| 2,209,576 A | 7/1940 | McDonald |
| 2,246,986 A | 6/1941 | Pellegrini |
| 2,436,961 A | 3/1948 | Gabriel |
| 2,487,921 A | 11/1949 | Culver |
| 2,492,068 A | 12/1949 | Schofield et al. |
| 2,566,401 A | 9/1951 | Bustin |
| 2,575,615 A | 11/1951 | Crump |
| 2,583,894 A | 1/1952 | Shuck |
| 2,645,504 A | 7/1953 | Branstrator et al. |
| 2,669,613 A | 2/1954 | Despard |
| 2,678,832 A | 5/1954 | Wright |
| 2,682,671 A | 7/1954 | Faure |
| 2,764,422 A | 9/1956 | McDonald |
| 2,774,494 A | 12/1956 | Malmström |
| 2,825,582 A | 3/1958 | McDonald |
| 2,921,643 A | 1/1960 | Vanderveld |
| 2,925,876 A | 2/1960 | Wagner |
| 2,998,265 A | 8/1961 | Kozicki |
| 3,008,533 A | 11/1961 | Haberle |
| 3,012,633 A | 12/1961 | Magee |
| 3,039,562 A | 6/1962 | Wagner |
| 3,095,216 A | 6/1963 | Browne et al. |
| 3,164,394 A | 1/1965 | Husko |
| 3,172,499 A | 3/1965 | Stairs |
| 3,266,594 A | 8/1966 | Antosh et al. |
| 3,329,443 A | 7/1967 | Lowder et al. |
| 3,392,990 A | 7/1968 | Wolf |
| 3,488,066 A | 1/1970 | Hansen |
| 3,494,634 A | 2/1970 | De Paula |
| 3,515,406 A | 6/1970 | Endsley |
| 3,517,942 A | 6/1970 | Cuffe et al. |
| 3,522,396 A | 7/1970 | Norden |
| 3,528,574 A | 9/1970 | Denner et al. |
| 3,572,754 A | 3/1971 | Fowler |
| 3,608,957 A | 9/1971 | Maneck |
| 3,650,423 A | 3/1972 | O'Brien |
| 3,671,058 A | 6/1972 | Kent |
| 3,745,595 A | 7/1973 | Nagy |
| 3,756,622 A | 9/1973 | Pyle et al. |
| 3,762,742 A | 10/1973 | Bucklen |
| 3,784,227 A | 1/1974 | Rogge |
| 3,799,288 A | 3/1974 | Manuel |
| 3,807,757 A | 4/1974 | Carpenter et al. |
| 3,833,240 A | 9/1974 | Weiler |
| 3,853,369 A | 12/1974 | Holden |
| 3,863,890 A | 2/1975 | Ruffing |
| 3,865,399 A | 2/1975 | Way |
| 3,869,022 A | 3/1975 | Wallk |
| 3,869,169 A | 3/1975 | Johnson et al. |
| 3,887,217 A | 6/1975 | Thomas |
| 3,889,997 A | 6/1975 | Schoneck |
| 3,891,261 A | 6/1975 | Finneman |
| 3,913,497 A | 10/1975 | Maroshick |
| 3,915,475 A | 10/1975 | Casella et al. |
| 3,957,284 A | 5/1976 | Wright |
| 3,961,809 A | 6/1976 | Clugston |
| 3,980,319 A | 9/1976 | Kirkpatrick |
| 3,981,515 A | 9/1976 | Rosborough |
| 3,986,724 A | 10/1976 | Rivinius |
| 3,997,211 A | 12/1976 | Graves |
| 4,020,920 A | 5/1977 | Abbott |
| 4,053,172 A | 10/1977 | McClure |
| 4,058,228 A | 11/1977 | Hall |
| 4,068,542 A | 1/1978 | Brand et al. |
| 4,073,502 A | 2/1978 | Frank et al. |
| 4,089,538 A | 5/1978 | Eastridge |
| 4,098,346 A | 7/1978 | Stanfill |
| 4,103,872 A | 8/1978 | Hirasuka |
| 4,106,790 A | 8/1978 | Weiler |
| 4,110,673 A | 8/1978 | Nagy et al. |
| 4,116,457 A | 9/1978 | Nerem et al. |
| 4,124,099 A | 11/1978 | Dudynskyj |
| 4,145,066 A | 3/1979 | Shearin |
| 4,164,292 A | 8/1979 | Karkau |
| 4,168,764 A | 9/1979 | Walters |
| 4,174,021 A | 11/1979 | Barlock |
| 4,180,143 A | 12/1979 | Clugston |
| 4,185,849 A | 1/1980 | Jaeger |
| 4,188,889 A | 2/1980 | Favrel |
| 4,194,754 A | 3/1980 | Hightower |
| 4,205,862 A | 6/1980 | Tarvin |
| 4,219,104 A | 8/1980 | MacLeod |
| 4,231,583 A | 11/1980 | Learn |
| 4,275,664 A | 6/1981 | Reddy |
| 4,325,668 A | 4/1982 | Julian et al. |
| 4,369,984 A | 1/1983 | Hagen |
| 4,424,751 A | 1/1984 | Blochlinger |
| 4,440,364 A | 4/1984 | Cone et al. |
| 4,462,486 A | 7/1984 | Dignan |
| 4,536,004 A | 8/1985 | Brynielsson et al. |
| 4,542,805 A | 9/1985 | Hamlin et al. |
| 4,570,962 A | 2/1986 | Chavira |
| 4,623,160 A | 11/1986 | Trudell |
| D287,001 S | 12/1986 | Jarvie et al. |
| 4,676,013 A | 6/1987 | Endo |
| 4,679,810 A | 7/1987 | Kimball |
| 4,696,349 A | 9/1987 | Harwood et al. |
| D292,904 S | 11/1987 | Bielby |
| 4,708,355 A | 11/1987 | Tiede |
| 4,711,613 A | 12/1987 | Fretwell |
| 4,720,116 A | 1/1988 | Williams et al. |
| 4,733,752 A | 3/1988 | Sklar |
| 4,757,876 A | 7/1988 | Peacock |
| 4,846,487 A | 7/1989 | Criley |
| 4,858,888 A | 8/1989 | Cruz et al. |
| 4,909,700 A | 3/1990 | Fontecchio et al. |
| 4,911,264 A | 3/1990 | McCafferty |
| 4,926,965 A | 5/1990 | Fox |
| 4,930,973 A | 6/1990 | Robinson |
| 4,958,979 A | 9/1990 | Svensson |
| 4,982,974 A | 1/1991 | Guidry |
| 4,991,890 A | 2/1991 | Paulson |
| D316,394 S | 4/1991 | Carr |
| 5,005,667 A | 4/1991 | Anderson |
| 5,005,850 A | 4/1991 | Baughman |
| 5,007,654 A | 4/1991 | Sauber |
| 5,028,063 A | 7/1991 | Andrews |
| 5,039,119 A | 8/1991 | Baughman |
| 5,085,450 A | 2/1992 | DeHart, Sr. |
| 5,137,294 A | 8/1992 | Martin |
| 5,154,125 A | 10/1992 | Renner et al. |
| 5,195,609 A | 3/1993 | Ham et al. |
| 5,199,731 A | 4/1993 | Martin |
| 5,228,707 A | 7/1993 | Yoder |
| 5,228,761 A | 7/1993 | Huebschen et al. |
| 5,238,300 A | 8/1993 | Slivon et al. |
| 5,253,973 A | 10/1993 | Fretwell |
| D340,905 S | 11/1993 | Orth et al. |
| 5,257,767 A | 11/1993 | McConnell |
| 5,257,847 A | 11/1993 | Yonehara |
| 5,261,779 A | 11/1993 | Goodrich |

(56) References Cited

U.S. PATENT DOCUMENTS

| | | |
|---|---|---|
| 5,280,934 A | 1/1994 | Monte |
| 5,284,349 A | 2/1994 | Bruns et al. |
| 5,286,049 A | 2/1994 | Khan |
| 5,342,073 A | 8/1994 | Poole |
| 5,358,268 A | 10/1994 | Hawkins |
| 5,375,864 A | 12/1994 | McDaniel |
| 5,423,463 A | 6/1995 | Weeks |
| 5,425,615 A | 6/1995 | Hall et al. |
| 5,439,342 A | 8/1995 | Hall et al. |
| 5,462,302 A | 10/1995 | Leitner |
| 5,478,124 A | 12/1995 | Warrington |
| 5,498,012 A | 3/1996 | McDaniel et al. |
| 5,501,475 A | 3/1996 | Bundy |
| 5,505,476 A | 4/1996 | Maccabee |
| 5,513,866 A | 5/1996 | Sisson |
| 5,538,100 A | 7/1996 | Hedley |
| 5,538,265 A | 7/1996 | Chen et al. |
| 5,538,269 A | 7/1996 | McDaniel et al. |
| 5,547,040 A | 8/1996 | Hanser et al. |
| 5,549,312 A | 8/1996 | Garvert |
| 5,584,493 A | 12/1996 | Demski et al. |
| 5,601,300 A | 2/1997 | Fink et al. |
| 5,624,127 A | 4/1997 | Arreola et al. |
| 5,697,623 A | 12/1997 | Bermes et al. |
| 5,697,626 A | 12/1997 | McDaniel |
| 5,727,840 A | 3/1998 | Ochiai et al. |
| 5,779,208 A | 7/1998 | McGraw |
| 5,842,709 A | 12/1998 | Maccabee |
| 5,876,051 A | 3/1999 | Sage |
| 5,897,125 A | 4/1999 | Bundy |
| 5,937,468 A | 8/1999 | Wiedeck et al. |
| 5,941,342 A | 8/1999 | Lee |
| 5,957,237 A | 9/1999 | Tigner |
| 5,980,449 A | 11/1999 | Benson et al. |
| 5,988,970 A | 11/1999 | Holtom |
| 6,012,545 A | 1/2000 | Faleide |
| 6,027,090 A | 2/2000 | Liu |
| 6,042,052 A | 3/2000 | Smith et al. |
| 6,055,780 A | 5/2000 | Yamazaki |
| 6,065,924 A | 5/2000 | Budd |
| 6,082,693 A | 7/2000 | Benson et al. |
| 6,082,751 A | 7/2000 | Hanes et al. |
| 6,112,152 A | 8/2000 | Tuttle |
| 6,135,472 A | 10/2000 | Wilson et al. |
| 6,149,172 A | 11/2000 | Pascoe et al. |
| 6,158,756 A | 12/2000 | Hansen |
| 6,168,176 B1 | 1/2001 | Mueller |
| 6,170,842 B1 | 1/2001 | Mueller |
| 6,179,312 B1 | 1/2001 | Paschke et al. |
| 6,179,546 B1 | 1/2001 | Citrowske |
| 6,203,040 B1 | 3/2001 | Hutchins |
| 6,213,486 B1 | 4/2001 | Kunz et al. |
| 6,224,317 B1 | 5/2001 | Kann |
| 6,264,222 B1 | 7/2001 | Johnston et al. |
| 6,270,099 B1 | 8/2001 | Farkash |
| 6,325,397 B1 | 12/2001 | Pascoe |
| 6,352,295 B1 | 3/2002 | Leitner |
| 6,357,992 B1 | 3/2002 | Ringdahl et al. |
| 6,375,207 B1 | 4/2002 | Dean et al. |
| 6,412,799 B1 | 7/2002 | Schrempf |
| 6,422,342 B1 | 7/2002 | Armstrong et al. |
| 6,425,572 B1 | 7/2002 | Lehr |
| 6,430,164 B1 | 8/2002 | Jones et al. |
| 6,435,534 B1 | 8/2002 | Stone |
| 6,439,342 B1 | 8/2002 | Boykin |
| 6,460,915 B1 | 10/2002 | Bedi et al. |
| 6,471,002 B1 | 10/2002 | Weinermen |
| 6,511,086 B2 | 1/2003 | Schlicht |
| 6,511,402 B2 | 1/2003 | Shu |
| 6,513,821 B1 | 2/2003 | Heil |
| 6,533,303 B1 | 3/2003 | Watson |
| 6,536,790 B1 | 3/2003 | Ojanen |
| 6,588,783 B2 | 7/2003 | Fichter |
| 6,612,596 B2 | 9/2003 | Jeon et al. |
| 6,641,158 B2 | 11/2003 | Leitner |
| 6,659,484 B2 | 12/2003 | Knodle et al. |
| 6,663,125 B1 | 12/2003 | Cheng |
| 6,746,033 B1 | 6/2004 | McDaniel |
| 6,769,704 B2 | 8/2004 | Cipolla |
| 6,810,995 B2 | 11/2004 | Warford |
| 6,812,466 B2 | 11/2004 | O'Connor et al. |
| 6,830,257 B2 | 12/2004 | Leitner |
| 6,834,875 B2 | 12/2004 | Leitner |
| 6,840,526 B2 | 1/2005 | Anderson et al. |
| 6,874,801 B2 | 4/2005 | Fichter |
| 6,880,843 B1 | 4/2005 | Greer, Jr. |
| 6,912,912 B2 | 7/2005 | Reichinger et al. |
| 6,918,624 B2 | 7/2005 | Miller et al. |
| 6,926,295 B2 | 8/2005 | Berkebile et al. |
| 6,938,909 B2 | 9/2005 | Leitner |
| 6,942,233 B2 | 9/2005 | Leitner et al. |
| 6,942,272 B2 | 9/2005 | Livingston |
| 6,948,903 B2 | 9/2005 | Ablabutyan et al. |
| 6,951,357 B2 | 10/2005 | Armstrong et al. |
| 6,955,370 B2 | 10/2005 | Fabiano et al. |
| 6,959,937 B2 | 11/2005 | Schneider et al. |
| 6,966,597 B2 | 11/2005 | Tegtmeier |
| 6,971,652 B2 | 12/2005 | Bobbert et al. |
| 6,997,469 B2 | 2/2006 | Lanoue et al. |
| 7,000,932 B2 | 2/2006 | Heil et al. |
| 7,007,961 B2 | 3/2006 | Leitner |
| 7,017,927 B2 | 3/2006 | Henderson et al. |
| 7,055,839 B2 | 6/2006 | Leitner |
| 7,090,276 B1 | 8/2006 | Bruford et al. |
| 7,111,859 B2 | 9/2006 | Kim et al. |
| 7,118,120 B2 | 10/2006 | Lee et al. |
| 7,163,221 B2 | 1/2007 | Leitner |
| 7,258,386 B2 | 8/2007 | Leitner |
| 7,287,771 B2 | 10/2007 | Lee et al. |
| 7,360,779 B2 | 4/2008 | Crandall |
| 7,367,574 B2 | 5/2008 | Leitner |
| 7,380,807 B2 | 6/2008 | Leitner |
| 7,398,985 B2 | 7/2008 | Leitner et al. |
| 7,413,204 B2 | 8/2008 | Leitner |
| 7,416,202 B2 | 8/2008 | Fichter |
| 7,487,986 B2 | 2/2009 | Leither et al. |
| 7,516,703 B2 | 4/2009 | Tazreiter |
| 7,566,064 B2 | 7/2009 | Leitner et al. |
| 7,584,975 B2 | 9/2009 | Leitner |
| 7,594,672 B2 | 9/2009 | Piotrowski |
| 7,621,546 B2 | 11/2009 | Ross et al. |
| 7,637,519 B2 | 12/2009 | Leitner et al. |
| 7,673,892 B2 | 3/2010 | Kuntze et al. |
| 7,717,444 B2 | 5/2010 | Fichter |
| 7,740,261 B2 | 6/2010 | Leitner et al. |
| 7,793,596 B2 | 9/2010 | Hirtenlehner |
| 7,823,896 B2 | 11/2010 | VanBelle |
| 7,874,565 B2 | 1/2011 | Duncan |
| D634,687 S | 3/2011 | Vukel |
| 7,900,944 B2 | 3/2011 | Watson |
| 7,909,344 B1 | 3/2011 | Bundy |
| 7,934,737 B2 | 5/2011 | Okada |
| 7,976,042 B2 | 7/2011 | Watson et al. |
| 8,038,164 B2 | 10/2011 | Stahl et al. |
| 8,042,821 B2 | 10/2011 | Yang |
| D649,100 S | 11/2011 | Cheng |
| 8,052,162 B2 | 11/2011 | Yang et al. |
| 8,056,913 B2 | 11/2011 | Kuntze et al. |
| 8,070,173 B2 | 12/2011 | Watson |
| 8,136,826 B2 | 3/2012 | Watson |
| 8,146,935 B1 | 4/2012 | Adams |
| 8,157,277 B2 | 4/2012 | Leitner et al. |
| 8,177,247 B1 | 5/2012 | Carr |
| 8,205,901 B2 | 6/2012 | Yang et al. |
| D665,713 S | 8/2012 | Pochurek et al. |
| 8,262,113 B1 | 9/2012 | Chafey et al. |
| 8,297,635 B2 | 10/2012 | Agoncillo et al. |
| D671,874 S | 12/2012 | Kekich et al. |
| 8,342,550 B2 | 1/2013 | Stickles et al. |
| 8,342,551 B2 | 1/2013 | Watson et al. |
| 8,360,455 B2 | 1/2013 | Leitner et al. |
| 8,408,571 B2 | 4/2013 | Leitner et al. |
| 8,419,034 B2 | 4/2013 | Leitner et al. |
| 8,469,380 B2 | 6/2013 | Yang et al. |

(56) References Cited

U.S. PATENT DOCUMENTS

| | | |
|---|---|---|
| 8,602,431 B1 | 12/2013 | May |
| 8,827,294 B1 | 9/2014 | Leitner et al. |
| 8,833,782 B2 | 9/2014 | Huotari et al. |
| 8,844,957 B2 | 9/2014 | Leitner et al. |
| D720,674 S | 1/2015 | Stanesic et al. |
| 8,936,266 B2 | 1/2015 | Leitner et al. |
| 8,944,451 B2 | 2/2015 | Leitner et al. |
| 9,156,406 B2 | 10/2015 | Stanesic et al. |
| 9,272,667 B2 | 3/2016 | Smith |
| 9,302,626 B2 | 4/2016 | Leitner et al. |
| 9,346,404 B1 | 5/2016 | Bundy |
| 9,346,405 B2 | 5/2016 | Leitner et al. |
| 9,511,717 B2 | 12/2016 | Smith |
| 9,522,634 B1 | 12/2016 | Smith |
| 9,527,449 B2 | 12/2016 | Smith |
| 9,550,458 B2 | 1/2017 | Smith et al. |
| 9,561,751 B2 | 2/2017 | Leitner et al. |
| 9,573,467 B2 | 2/2017 | Chen et al. |
| 9,656,609 B2 | 5/2017 | Du et al. |
| 9,669,766 B2 | 6/2017 | Du et al. |
| 9,669,767 B2 | 6/2017 | Du et al. |
| 9,688,205 B2 | 6/2017 | Du et al. |
| 9,701,249 B2 | 7/2017 | Leitner et al. |
| 9,764,691 B2 | 9/2017 | Stickles et al. |
| 9,809,172 B2 | 11/2017 | Stanesic et al. |
| 9,834,147 B2 | 12/2017 | Smith |
| 9,902,328 B1 | 2/2018 | Mazur |
| 9,944,231 B2 | 4/2018 | Leitner et al. |
| 9,975,742 B1* | 5/2018 | Mason .................... B66D 1/46 |
| 10,010,467 B2 | 7/2018 | Sato |
| 10,049,505 B1* | 8/2018 | Harvey ................ G07C 5/0841 |
| 10,053,017 B2 | 8/2018 | Leitner et al. |
| 10,065,486 B2 | 9/2018 | Smith et al. |
| 10,077,016 B2 | 9/2018 | Smith et al. |
| 10,081,302 B1 | 9/2018 | Frederick et al. |
| 10,106,069 B2 | 10/2018 | Rasekhi |
| 10,106,086 B1 | 10/2018 | Eckstein et al. |
| 10,106,087 B2 | 10/2018 | Stojkovic et al. |
| 10,106,088 B2 | 10/2018 | Smith |
| 10,118,557 B2 | 11/2018 | Pribisic |
| 10,124,735 B2 | 11/2018 | Du et al. |
| 10,124,839 B2 | 11/2018 | Povinelli et al. |
| 10,140,618 B2 | 11/2018 | Crawford |
| 10,144,345 B2 | 12/2018 | Stinson et al. |
| 10,150,419 B2 | 12/2018 | Derbis et al. |
| 10,155,474 B2 | 12/2018 | Salter et al. |
| 10,173,595 B1 | 1/2019 | Ulrich |
| 10,183,623 B2 | 1/2019 | Kirshnan et al. |
| 10,183,624 B2 | 1/2019 | Leitner et al. |
| 10,189,517 B2 | 1/2019 | Povinelli et al. |
| 10,195,997 B2 | 2/2019 | Smith |
| 10,207,598 B2 | 2/2019 | Reynolds et al. |
| 10,214,963 B2 | 2/2019 | Simula et al. |
| 10,336,260 B1* | 7/2019 | Salter ..................... B60R 3/02 |
| 10,384,614 B1 | 8/2019 | Du et al. |
| 10,427,607 B2 | 10/2019 | Otacioglu |
| 10,539,285 B1 | 1/2020 | Johnson |
| 10,576,879 B1 | 3/2020 | Salter |
| 10,618,472 B2 | 4/2020 | Du |
| 10,649,483 B2 | 5/2020 | Liu et al. |
| 10,682,960 B2 | 6/2020 | Du |
| 10,821,904 B2 | 11/2020 | Du |
| 10,885,759 B1 | 1/2021 | Lee |
| 11,021,108 B2 | 6/2021 | Du |
| 11,198,394 B2 | 12/2021 | Du et al. |
| 11,208,043 B2 | 12/2021 | Du et al. |
| 11,292,390 B2 | 4/2022 | Du et al. |
| 11,318,889 B2 | 5/2022 | Du et al. |
| 11,414,017 B2 | 8/2022 | Qing et al. |
| 2003/0011164 A1 | 1/2003 | Cipolla |
| 2003/0038446 A1 | 2/2003 | Anderson et al. |
| 2003/0090081 A1 | 5/2003 | Oakley |
| 2003/0094781 A1 | 5/2003 | Jaramillo et al. |
| 2003/0132595 A1 | 7/2003 | Fabiano |
| 2003/0200700 A1 | 10/2003 | Leitner |
| 2004/0100063 A1 | 5/2004 | Henderson et al. |
| 2004/0108678 A1 | 6/2004 | Berkebile et al. |
| 2004/0135339 A1 | 7/2004 | Kim |
| 2005/0035568 A1 | 2/2005 | Lee et al. |
| 2005/0146157 A1 | 7/2005 | Leitner |
| 2005/0231149 A1 | 10/2005 | Numauchi |
| 2005/0280242 A1 | 12/2005 | Fabiano et al. |
| 2006/0082096 A1 | 4/2006 | Sukonthapanich et al. |
| 2006/0214386 A1 | 9/2006 | Watson |
| 2006/0219484 A1 | 10/2006 | Ogura |
| 2006/0284440 A1 | 12/2006 | Leitner |
| 2008/0042396 A1 | 2/2008 | Watson |
| 2008/0100023 A1 | 5/2008 | Ross |
| 2008/0100025 A1 | 5/2008 | Leitner et al. |
| 2008/0116653 A1 | 5/2008 | Piotrowski |
| 2008/0271936 A1 | 11/2008 | Kuntze et al. |
| 2009/0250896 A1 | 10/2009 | Watson |
| 2009/0295114 A1 | 12/2009 | Yang et al. |
| 2009/0295115 A1 | 12/2009 | Yang et al. |
| 2010/0044993 A1 | 2/2010 | Watson |
| 2011/0115187 A1 | 5/2011 | Leitner et al. |
| 2011/0246021 A1* | 10/2011 | Prokhorov ............. B60T 7/122 |
| | | 701/36 |
| 2012/0025485 A1 | 2/2012 | Yang et al. |
| 2012/0046846 A1 | 2/2012 | Dollens |
| 2013/0154230 A1 | 6/2013 | Ziaylek |
| 2015/0094898 A1* | 4/2015 | Tellis .................... B60W 40/12 |
| | | 701/23 |
| 2015/0097353 A1 | 4/2015 | Rasmussen et al. |
| 2015/0137482 A1 | 5/2015 | Woolf |
| 2015/0197199 A1 | 7/2015 | Kuo |
| 2015/0321612 A1 | 11/2015 | Leitner et al. |
| 2015/0321613 A1 | 11/2015 | Leitner et al. |
| 2016/0039346 A1 | 2/2016 | Yang et al. |
| 2016/0193964 A1 | 7/2016 | Stanesic et al. |
| 2016/0280190 A1* | 9/2016 | Franz ..................... B60T 7/22 |
| 2017/0008459 A1 | 1/2017 | Leitner et al. |
| 2017/0021781 A1 | 1/2017 | Du |
| 2017/0036605 A1 | 2/2017 | Du |
| 2017/0036606 A1 | 2/2017 | Du |
| 2017/0036607 A1 | 2/2017 | Du et al. |
| 2017/0144606 A1 | 5/2017 | Smith |
| 2017/0190308 A1 | 6/2017 | Smith |
| 2017/0246993 A1 | 8/2017 | Smith |
| 2017/0267182 A1 | 9/2017 | Leitner |
| 2017/0355315 A1 | 12/2017 | Leitner |
| 2018/0095457 A1* | 4/2018 | Lee ....................... G05D 1/0061 |
| 2018/0118530 A1 | 5/2018 | August |
| 2018/0141497 A1 | 5/2018 | Smith |
| 2018/0201194 A1 | 7/2018 | Stanesic |
| 2018/0257572 A1 | 9/2018 | Du et al. |
| 2018/0281687 A1 | 10/2018 | Derbis et al. |
| 2018/0293811 A1* | 10/2018 | Liu ....................... G07C 5/0808 |
| 2018/0326911 A1 | 11/2018 | Leitner |
| 2019/0009725 A1 | 1/2019 | Stojkovic et al. |
| 2019/0047477 A1 | 2/2019 | Crandall |
| 2019/0054961 A1 | 2/2019 | Ngo |
| 2019/0071021 A1 | 3/2019 | Pribisic |
| 2019/0071042 A1 | 3/2019 | Smith |
| 2019/0084482 A1 | 3/2019 | Long et al. |
| 2019/0084628 A1 | 3/2019 | Povinelli et al. |
| 2019/0292026 A1 | 9/2019 | Felps |
| 2020/0023779 A1 | 1/2020 | Du et al. |
| 2020/0023780 A1 | 1/2020 | Du et al. |
| 2020/0047674 A1 | 2/2020 | Du et al. |
| 2020/0262354 A1 | 8/2020 | Du et al. |
| 2020/0265658 A1 | 8/2020 | Du et al. |
| 2020/0269763 A1 | 8/2020 | Du et al. |
| 2020/0277169 A1 | 9/2020 | Zhan |
| 2020/0282814 A1 | 9/2020 | Alban et al. |
| 2020/0282913 A1 | 9/2020 | Qing |
| 2020/0290424 A1 | 9/2020 | Zhan |
| 2020/0299116 A1 | 9/2020 | Fan |
| 2020/0282914 A1 | 10/2020 | Du et al. |
| 2020/0331396 A1 | 10/2020 | Du et al. |
| 2021/0078591 A1 | 3/2021 | Du et al. |
| 2021/0213885 A1 | 7/2021 | Du et al. |
| 2021/0347303 A1 | 11/2021 | Qing et al. |

(56) References Cited

U.S. PATENT DOCUMENTS

| | | |
|---|---|---|
| 2021/0347304 A1 | 11/2021 | Qing et al. |
| 2022/0194299 A1 | 6/2022 | Du et al. |
| 2022/0219612 A1 | 7/2022 | Du et al. |

FOREIGN PATENT DOCUMENTS

| | | | |
|---|---|---|---|
| CA | 2218280 A1 | 6/1999 | |
| CA | 2332193 A1 | 9/2001 | |
| CA | 2370618 A1 | 11/2007 | |
| CN | 2174368 Y | 8/1994 | |
| CN | 2806241 Y | 8/2006 | |
| CN | 1976833 A | 6/2007 | |
| CN | 101279594 A | 10/2008 | |
| CN | 102394918 A | 3/2012 | |
| CN | 202806579 U | 3/2013 | |
| CN | 103507719 A | 1/2014 | |
| CN | 203728468 U | 7/2014 | |
| CN | 104192070 A | 12/2014 | |
| CN | 2044474223 U | 7/2015 | |
| CN | 105083136 A | 11/2015 | |
| CN | 105083137 A | 11/2015 | |
| CN | 105128751 A | 12/2015 | |
| CN | 105450762 A | 3/2016 | |
| CN | 106249641 A | 12/2016 | |
| CN | 106499293 A | 3/2017 | |
| CN | 108263303 A | 7/2018 | |
| CN | 108454518 A | 8/2018 | |
| CN | 207758678 U | 8/2018 | |
| CN | 108583446 A | 9/2018 | |
| CN | 108632335 A | 10/2018 | |
| CN | 108791086 A | 11/2018 | |
| CN | 208037900 U | 11/2018 | |
| CN | 108973868 A | 12/2018 | |
| CN | 208232903 U | 12/2018 | |
| CN | 109253888 A | 1/2019 | |
| CN | 208325054 U | 1/2019 | |
| CN | 208344082 U | 1/2019 | |
| DE | 1042403 B | 10/1958 | |
| DE | 1220276 B | 6/1966 | |
| DE | 2555468 A1 | 6/1977 | |
| DE | 7922488 U1 | 7/1982 | |
| DE | 3151621 A1 | 7/1983 | |
| DE | 3932142 | 4/1990 | |
| DE | 8910933 U1 | 10/1990 | |
| DE | 10050383 B4 * | 8/2016 | ............... B60K 6/48 |
| EP | 0066493 | 12/1982 | |
| EP | 373842 A1 | 6/1990 | |
| EP | 0418615 A1 | 3/1991 | |
| EP | 0559624 B1 | 8/1995 | |
| EP | 0966367 A1 | 9/1998 | |
| EP | 0901783 A2 | 3/1999 | |
| EP | 1116840 A2 | 7/2001 | |
| EP | 1213185 B1 | 12/2004 | |
| EP | 3002157 | 4/2016 | |
| EP | 3176038 B1 | 1/2019 | |
| EP | 3237254 B1 | 2/2019 | |
| FR | 1271901 A | 9/1961 | |
| FR | 1350593 A | 12/1963 | |
| FR | 2225612 A | 8/1974 | |
| FR | 2651739 A1 | 3/1991 | |
| FR | 2764254 A1 | 12/1998 | |
| GB | 191315077 | 8/1913 | |
| GB | 254426 | 7/1926 | |
| GB | 340162 A | 12/1930 | |
| GB | 381672 | 10/1932 | |
| GB | 745918 | 3/1956 | |
| GB | 934387 | 8/1963 | |
| GB | 936846 | 9/1963 | |
| GB | 987846 A | 3/1965 | |
| GB | 1430813 A | 4/1976 | |
| GB | 1471256 A | 4/1977 | |
| GB | 2045699 A | 11/1980 | |
| GB | 2055705 A | 3/1981 | |
| GB | 2129378 | 5/1984 | |
| GB | 2201511 A | 9/1988 | |
| GB | 2288014 A | 10/1995 | |
| IN | 201741011829 | 10/2018 | |
| JP | 63-255144 A | 10/1988 | |
| JP | H04138944 A | 5/1992 | |
| JP | H04339040 A | 11/1992 | |
| JP | H04342629 A | 11/1992 | |
| JP | H05310061 A | 11/1993 | |
| JP | H05310081 A | 11/1993 | |
| JP | H08132967 A | 5/1996 | |
| JP | H10287182 A | 10/1998 | |
| JP | 2018-177089 A | 11/2018 | |
| JP | 2019-001222 A | 1/2019 | |
| KR | 2000-0003099 | 1/2000 | |
| MX | 2017001699 A | 8/2018 | |
| MX | 2017001700 A | 8/2018 | |
| MX | 2017006328 A | 8/2018 | |
| MX | 2017008032 A | 9/2018 | |
| MX | 2017010183 A | 9/2018 | |
| SU | 403594 | 11/1973 | |
| SU | 783097 A1 | 11/1980 | |
| WO | 1988/05759 A1 | 8/1988 | |
| WO | 1995/00359 A1 | 1/1995 | |
| WO | 1997/027139 A1 | 7/1997 | |
| WO | 1998/43856 A2 | 10/1998 | |
| WO | 2000/047449 A1 | 8/2000 | |
| WO | 2001/000441 A1 | 1/2001 | |
| WO | 2003/039910 A1 | 5/2003 | |
| WO | 2003/039920 A1 | 5/2003 | |
| WO | 2003/066380 A1 | 8/2003 | |
| WO | 2003/069294 A1 | 8/2003 | |
| WO | 2006/050297 A2 | 5/2006 | |
| WO | 2009/103163 A1 | 8/2009 | |
| WO | 2017/176226 A1 | 10/2017 | |
| WO | 2018/148643 A1 | 8/2018 | |
| WO | 2018/197393 A1 | 11/2018 | |
| WO | 2019/009131 A1 | 1/2019 | |
| WO | 2019/034493 A1 | 2/2019 | |

OTHER PUBLICATIONS

International Search Report and Written Opinion of the International Searching Authority for PCT International Application No. PCT/CN2019/082919 dated Oct. 11, 2019. (English Translation, p. 1-20).

International Search Report and Written Opinion of the International Searching Authority for PCT International Application No. PCT/CN2019/075535 dated Nov. 11, 2019. (English translation, p. 1-21).

U.S. Office Action dated Jun. 9, 2020 for U.S. Appl. No. 16/826,094, filed Mar. 20, 2020 (10 pages).

U.S. Office Action dated Jun. 9, 2020 for U.S. Appl. No. 15/931,474, filed May 13, 2020 (12 pages).

U.S. Notice of Allowance for U.S. Appl. No. 16/510,775 dated Feb. 3, 2020.

U.S. Notice of Allowance for U.S. Appl. No. 16/655,149 dated Feb. 20, 2020.

U.S. Notice of Allowance for U.S. Appl. No. 16/826,083 dated Oct. 9, 2020.

Australian Application No. 2019250149 Office Action dated Oct. 6, 2020, pp. 1-4).

Final Office Action dated Oct. 27, 2020 for U.S. Appl. No. 15/931,474, filed Oct. 27, 2020 (13 pages).

Final Office Action dated Feb. 16, 2021 for U.S. Appl. No. 16/826,094, filed Mar. 20, 2020 (15 pages).

Non-Final Office Action dated Jun. 10, 2021 for U.S. Appl. No. 16/517,527, filed Jul. 19, 2019 (6 pages).

U.S. Appl. No. 16/742,632 Notice of Allowance dated Jun. 29, 2021, pp. 1-7.

Chinese Application No. 201910125764.6 Office Action dated May 6, 2021, pp. 1-13.

International Search Report and Written Opinion of the International Searching Authority for PCT International Application No. PCT/CN2015/097930 dated May 10, 2016.

U.S. Office Action dated Nov. 18, 2019 for U.S. Appl. No. 16/510,775, filed Jul. 12, 2019. (9 pages).

(56) References Cited

OTHER PUBLICATIONS

U.S. Office Action dated Dec. 20, 2019 for U.S. Appl. No. 16/655,149, filed Oct. 16, 2019. (11 pages).

* cited by examiner

MANAGEMENT APPARATUS FOR A VEHICLE DEVICE, VEHICLE AND SERVER

CROSS-REFERENCE TO RELATED APPLICATIONS

This application claims priority to and benefits of Chinese Patent Application Serial No. 201910125764.6, filed with the State Intellectual Property Office of P. R. China on Feb. 20, 2019, the entire content of which is incorporated herein by reference.

TECHNICAL FIELD

The present disclosure relates to the field of automobile technology, and more particularly to a management apparatus for a vehicle device, a vehicle having the same and a server.

BACKGROUND

With the advancement of technology and the development of the automotive industry, various new techniques are constantly being applied to the automotive industry, which provides favorable conditions for intelligent and networked management of automobiles. However, existing vehicle devices, such as electric pedals, electric winches, etc., apply traditional electronic control means, which is not conducive to intelligent control of the automobiles.

SUMMARY

Embodiments of the present disclosure seek to solve at least one of the problems existing in the related art to at least some extent.

According to a first aspect of embodiments of the present disclosure, a management apparatus for a vehicle device is provided. The management apparatus includes: a state determining unit, configured to determine a current state of the vehicle device; a first communication module, configured to transmit the current state of the vehicle device to at least one of a mobile terminal and a server and to receive a control instruction generated by the at least one of the mobile terminal and the server according to the current state of the vehicle device; and a controller, configured to control an action-executing unit of the vehicle device according to the control instruction to drive the vehicle device to execute an action.

According to a second aspect of embodiments of the present disclosure, a vehicle is provided, including a management apparatus for a vehicle device as described above.

According to a third aspect of embodiments of the present disclosure, a server is provided. The server includes: a second communication module, configured to receive a current state of a vehicle device transmitted from a management apparatus of the vehicle device or from a mobile terminal; and a first processing module, configured to generate a control instruction according to the current state of the vehicle device, and the second communication module is further configured to transmit the control instruction to the management apparatus of the vehicle device for driving the vehicle device to execute an action.

Additional aspects and advantages of embodiments of the present disclosure will be described in the following descriptions.

DETAILED DESCRIPTION

Figure 1:
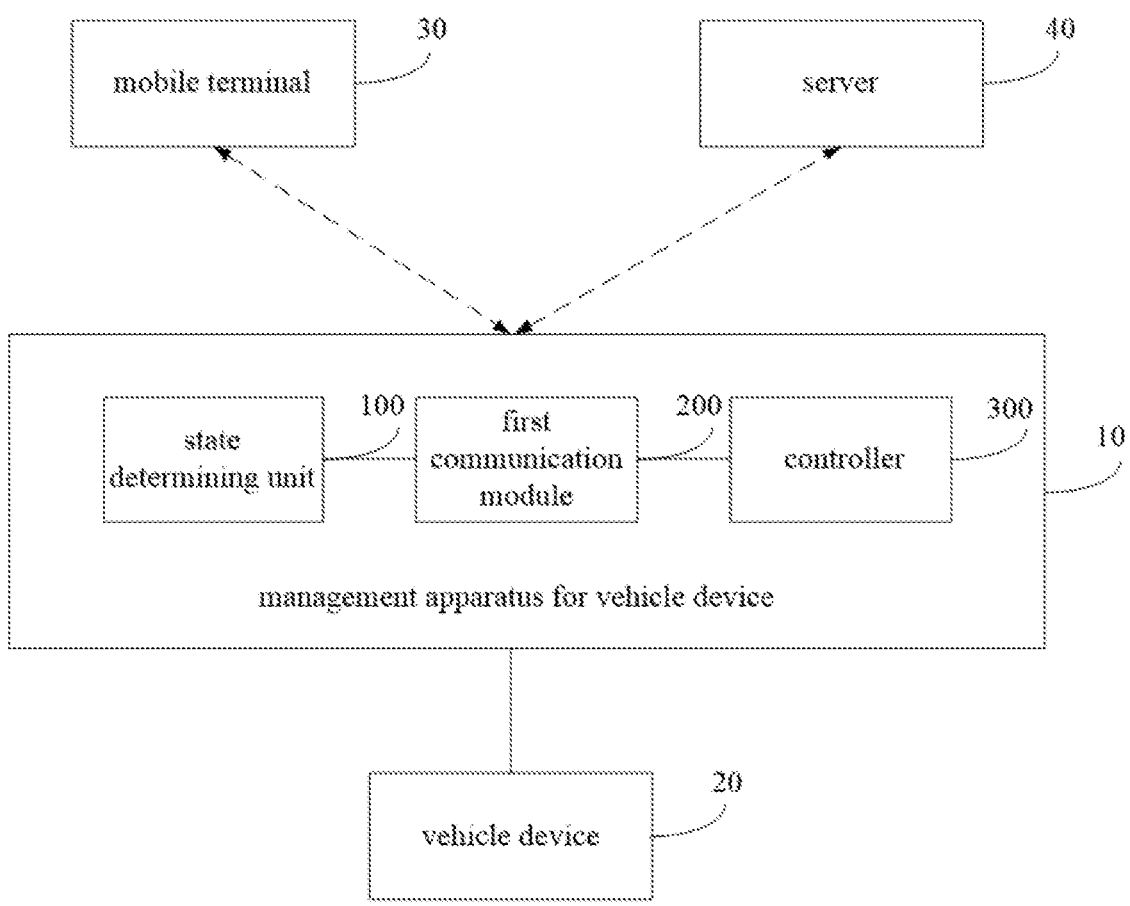
FIG. 1 is a block diagram of a management apparatus for a vehicle device according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

According to a first aspect of embodiments of the present disclosure, a management apparatus for a vehicle device is provided, which is able to intelligently control the vehicle device, and improve user experiences.

In some embodiments of the present disclosure, the management apparatus includes: a state determining unit, configured to determine a current state of the vehicle device; a first communication module, configured to transmit the current state of the vehicle device to at least one of a mobile terminal and a server and to receive a control instruction generated by the at least one of the mobile terminal and the server according to the current state of the vehicle device; and a controller, configured to control an action-executing unit of the vehicle device according to the control instruction to drive the vehicle device to execute an action.

The management apparatus for the vehicle device according to embodiments of the present disclosure is capable of transmitting the current state of the vehicle device to at least one of the mobile terminal and the server and receiving the control instruction from the at least one of the mobile terminal and the server, so as to control the vehicle device to execute an action corresponding to the received control instruction, thereby making the vehicle more intelligent and automated, enhancing the practicability of the vehicle, achieving systematic, intelligent and networked management of the vehicle, effectively meeting usage demands, and improving user experiences.

Further, in an embodiment of the present disclosure, the first communication module is further configured to receive at least one of fault diagnosis information, device maintenance information and device upgrade information generated by at least one of the mobile terminal and the server according to at least one of the current state and historical data of the vehicle device, and the controller is further configured to control a fault alert, device maintenance and device upgrade of the vehicle device according to the fault diagnosis information, the device maintenance information and the device upgrade information, respectively.

Further, in an embodiment of the present disclosure, the management apparatus further includes: a collecting unit, configured to collect operating information of the vehicle device and to transmit the operating information to at least one of the mobile terminal and the server via the first communication module for generation of service information, and the operating information includes at least one of text information, picture information, audio information and video information.

Further, in an embodiment of the present disclosure, the state determining unit is further configured to determine the current state of the vehicle device according to a current operating parameter of the vehicle device.

Further, in an embodiment of the present disclosure, the state determining unit includes a first state sensing unit configured to determine a current state of a winch according to at least one of an operating current, current pulling force, current speed and current temperature of the winch.

Further, in an embodiment of the present disclosure, the controller includes a winch controller configured to determine a target state of the winch according to the control instruction and control one or more actions of a winch driving device, an optical winch display device and an acoustic winch alerting device according to the target state of the winch.

Further, in an embodiment of the present disclosure, the state determining unit includes a second state sensing unit configured to determine a current state of a pedal according to at least one of an operating state and an operating current of the pedal.

Further, in an embodiment of the present disclosure, the controller includes a pedal controller configured to determine a target state of the pedal according to the control instruction and control one or more actions of a pedal driving device, an optical pedal display device and an acoustic pedal alerting device according to the target state of the pedal.

Further, in an embodiment of the present disclosure, the management apparatus further includes an environment determining module configured to determine a current vehicle condition, and the controller is further configured to instruct the action-executing unit of the vehicle device not to respond to the control instruction when the current vehicle condition does not meet a preset condition.

According to a second aspect of embodiments of the present disclosure, there is provided a vehicle, including a management apparatus for a vehicle device as described above.

The vehicle according to embodiments of the present disclosure is capable of transmitting the current state of the vehicle device to at least one of the mobile terminal and the server and receiving the control instruction from the at least one of the mobile terminal and the server, so as to control the vehicle device to execute an action corresponding to the received control instruction, thereby making the vehicle more intelligent and automated, enhancing the practicability of the vehicle, achieving systematic, intelligent and networked management of the vehicle, effectively meeting usage demands, and improving user experiences.

According to a third aspect of embodiments of the present disclosure, a server is provided. The server includes: a second communication module configured to receive a current state of a vehicle device transmitted from a management apparatus of the vehicle device or from a mobile terminal; and a first processing module configured to generate a control instruction according to the current state of the vehicle device, and the second communication module is further configured to transmit the control instruction to the management apparatus of the vehicle device for driving the vehicle device to execute an action.

The server according to embodiments of the present disclosure is capable of receiving the current state of the vehicle device, generating a control instruction according to the current state of the vehicle device, and transmitting the control instruction to the management apparatus of the vehicle device for driving the vehicle device to execute an action, thereby making the vehicle more intelligent and automated, enhancing the practicability of the vehicle, achieving systematic, intelligent and networked management of the vehicle, effectively meeting usage demands, and improving user experiences.

Further, in an embodiment of the present disclosure, the server further includes: a second processing module, configured to generate at least one of fault diagnosis information, device maintenance information and device upgrade information according to at least one of the current state and historical data of the vehicle device transmitted from at least one of the management apparatus of the vehicle device and the mobile terminal, so as to enable the management apparatus to perform a fault alert, device maintenance and device upgrade to the vehicle device according to the fault diagnosis information, the device maintenance information and the device upgrade information, respectively.

Further, in an embodiment of the present disclosure, the server further includes a service module, configured to generate service information according to operating information of the vehicle device transmitted from at least one of the mobile terminal and the management apparatus of the vehicle device, and the operating information includes at least one of text information, picture information, audio information and video information.

In the following, a management apparatus for a vehicle device, a vehicle having the same and a server according to embodiments of the present disclosure will be described in detail with reference to drawings.

FIG. 1 is a block diagram of a management apparatus for a vehicle device according to an embodiment of the present disclosure. As illustrated in FIG. 1, the management apparatus 10 for the vehicle device 20 includes a state determining unit 100, a first communication module 200 and a controller 300. In some embodiments, the management apparatus 10 includes a data processing unit including a processor to process data, a memory in communication with the processor to store data, and an input/output unit (I/O) to interface the processor and/or memory to other modules, units or devices, such as the vehicle device 20, the mobile terminal 30 and the server 40. For example, the processor can include a central processing unit (CPU) or a microcontroller unit (MCU). For example, the memory can include and store processor-executable code, which when executed by the processor, configures the data processing unit to perform various operations, e.g., such as receiving information, commands, and/or data, processing information and data, and transmitting or providing information/data to another device in accordance with the operations described in the present disclosure. In some implementations, the data processing unit can transmit raw or processed data to a computer system or communication network accessible via the Internet (referred to as 'the cloud') that includes one or more remote computational processing devices (e.g., servers in the cloud). To support various functions of the data processing unit, the memory can store information and data, such as instructions, software, values, images, and other data processed or referenced by the processor. For example, various types of Random Access Memory (RAM) devices, Read Only Memory (ROM) devices, Flash Memory devices, and other suitable storage media can be used to implement storage functions of the memory. In some embodiments, the management apparatus 10 a wireless communication unit, such as a wireless transmitter to transmit stored and/or processed data or a wireless transceiver (Tx/Rx) to transmit and receive data. The I/O of the data processing unit can interface the data processing unit with the wireless communications unit to utilize various types of wired or wireless interfaces compatible with typical data communication standards, for example, which can be used in communications of the management apparatus 10 with other devices, such as the vehicle device 20, the mobile terminal 30 and the server 40, via a wireless transmitter/receiver (Tx/Rx) unit, e.g., including, but not limited to, Bluetooth, Bluetooth low energy, Zigbee, IEEE 802.11, Wireless Local Area Network (WLAN), Wireless Personal Area Network (WPAN), Wireless Wide Area Network (WWAN), WiMAX, IEEE 802.16 (Worldwide Interoperability for Microwave Access (WiMAX)), 3G/4G/LTE/5G cellular communication methods, NFC (Near Field Communication), and parallel interfaces.

The management apparatus 10 includes software modules for executing various functions of the management apparatus 10. The state determining unit 100 is configured to determine a current state of the vehicle device 20. The first communication module 200 is configured to transmit the current state of the vehicle device to at least one of a mobile terminal 30 and a server 40 and to receive a control instruction generated by the at least one of the mobile terminal 30 and the server 40 according to the current state of the vehicle device. The controller 300 is configured to control an action-executing unit 50 of the vehicle device 20 according to the control instruction to drive the vehicle device 20 to execute an action. The management apparatus 10 according to embodiments of the present disclosure is able to intelligently control the vehicle device, effectively meet usage demands, and improve user experiences.

It will be understood that existing vehicle devices, such as retrofit products, e.g., including electric pedals and electric winches, etc., apply traditional electronic control means, which is not conducive to intelligent control of these vehicle devices. However, the management apparatus 10 according to embodiments of the present disclosure is capable of controlling and managing the vehicle device 20 intelligently via a mobile terminal (such as a mobile phone, a tablet, a wearable device, etc., for example, controlling the vehicle device 20 to turn on or turn off, or adjusting working parameters of the vehicle device 20.

In embodiments of the present disclosure, Internet of Things (IoT) technology is applied to the control of the vehicle device 20, which imparts a function of intelligent interconnection to the vehicle device 20, thereby enhancing user experiences.

Specifically, as the name implies, IoT refers to a concept of extending Internet connectivity into the connectivity between objects, which is an extension and expansion of the Internet, but its core and foundation are still the Internet. IoT has evolved due to the convergence of multiple technologies, such as intellisense, identification, communication and pervasive computing technologies, etc., which is not only an important part of the new generation of information technology, but also an important development stage in the information age, and thus it is called the third wave of the development of the world information industry after computers and the Internet. With IoT, information exchange and communication between objects are realized.

In embodiments of the present disclosure, the intelligent management of the vehicle device is achieved on the basis of the IoT technology, and user experiences are effectively improved.

It should be understood that, the vehicle device 20 used herein may refer to any product or device loaded on a vehicle, including but not limited to a vehicle-mounted product or a vehicle retrofit product, such as an electric pedal, a power liftgate, an electric winch, a refitted lamp, a refitted speaker, etc.

For example, a user may control, via the mobile terminal, automatic extension and contraction of the electric pedal, opening or closing of the power liftgate, or rotation of an engine of the electric winch to pull an object.

To facilitate the understanding of those skilled in the art, examples with respect to the electric pedal and the electric winch will be illustrated below.

Further, in an embodiment of the present disclosure, the first communication module 200 is further configured to receive at least one of fault diagnosis information, device maintenance information and device upgrade information generated by at least one of the mobile terminal 30 and the server 40 according to at least one of the current state and historical data of the vehicle device, and the controller 300 is further configured to control a fault alert, device maintenance and device upgrade of the vehicle device 20 according to the fault diagnosis information, the device maintenance information and the device upgrade information, respectively.

As is known in the related field, the existing technologies cannot achieve functions of remote fault diagnosis, remote product maintenance and remote product upgrade. Moreover, the fault diagnosis, the product maintenance and the product upgrade need workers to operate on site, and thus are difficult and costly.

However, in the management apparatus 10 according to embodiments of the present disclosure, the IoT technology is applied to the control of the vehicle device 20, which not only imparts the function of intelligent interconnection to the vehicle device 20, such that the vehicle device 20 may be intelligently managed using the mobile terminal, but also solves problems of the remote fault diagnosis, the remote product maintenance, and the remote product upgrade of the vehicle device 20, thereby effectively achieving functions for the remote fault diagnosis, the remote product maintenance, and the remote product upgrade of the vehicle device using the Internet.

With the management apparatus 10 according to embodiments of the present disclosure, a manufacturer of the vehicle device 20 may realize the remote fault diagnosis, the remote product maintenance and the remote product upgrade using the Internet.

For example, a user may transmit an upgrade request via the mobile terminal 30; alternatively, the server 40 may transmit an upgrade instruction. When the upgrade instruction is confirmed by the user via the mobile terminal 30, the server 40 packs upgrade files to generate an upgrade package and transmits the upgrade package to the management apparatus 10 or to the management apparatus 10 via the mobile terminal 30. Based on the upgrade package, a system of the vehicle device 20 is upgraded. Moreover, in an embodiment of the present disclosure, the management apparatus 10 is further configured to determine whether the upgrade package meets an upgrade condition and upgrade the system of the vehicle device 20 when the upgrade package meets the upgrade condition.

In an embodiment of the present disclosure, the server 40 is configured to determine whether the vehicle device 20 is faulty according to the current state and/or the historical data of the vehicle device 20. For example, if an operating state of the electric pedal is inconsistent with an operating current thereof, it is determined that a fault has occurred to the electric pedal, so that it can be ensured that the electric pedal is maintained in time, and that the maintenance record is retained, facilitating later evaluations of the vehicle device 20.

Further, in an embodiment of the present disclosure, the management apparatus 20 further includes a collecting unit. The collecting unit is configured to collect operating information of the vehicle device 20 and transmit the operating information to at least one of the mobile terminal 30 and the server 40 via the first communication module 200 for generation of service information. In embodiments of the present disclosure, the operating information includes at least one of text information, picture information, audio information and video information.

In the related art, the problem of after-sales services of the vehicle device 20 cannot be timely and effectively solved by a relevant technology center.

However, the management apparatus 10 according to embodiments of the present disclosure is able to achieve online after-sales services of the vehicle device by taking advantage of timely and effective communication among two or more of the user, the vehicle device, and the manufacturer of the vehicle device via texts, pictures, audios and videos.

Figure 2:
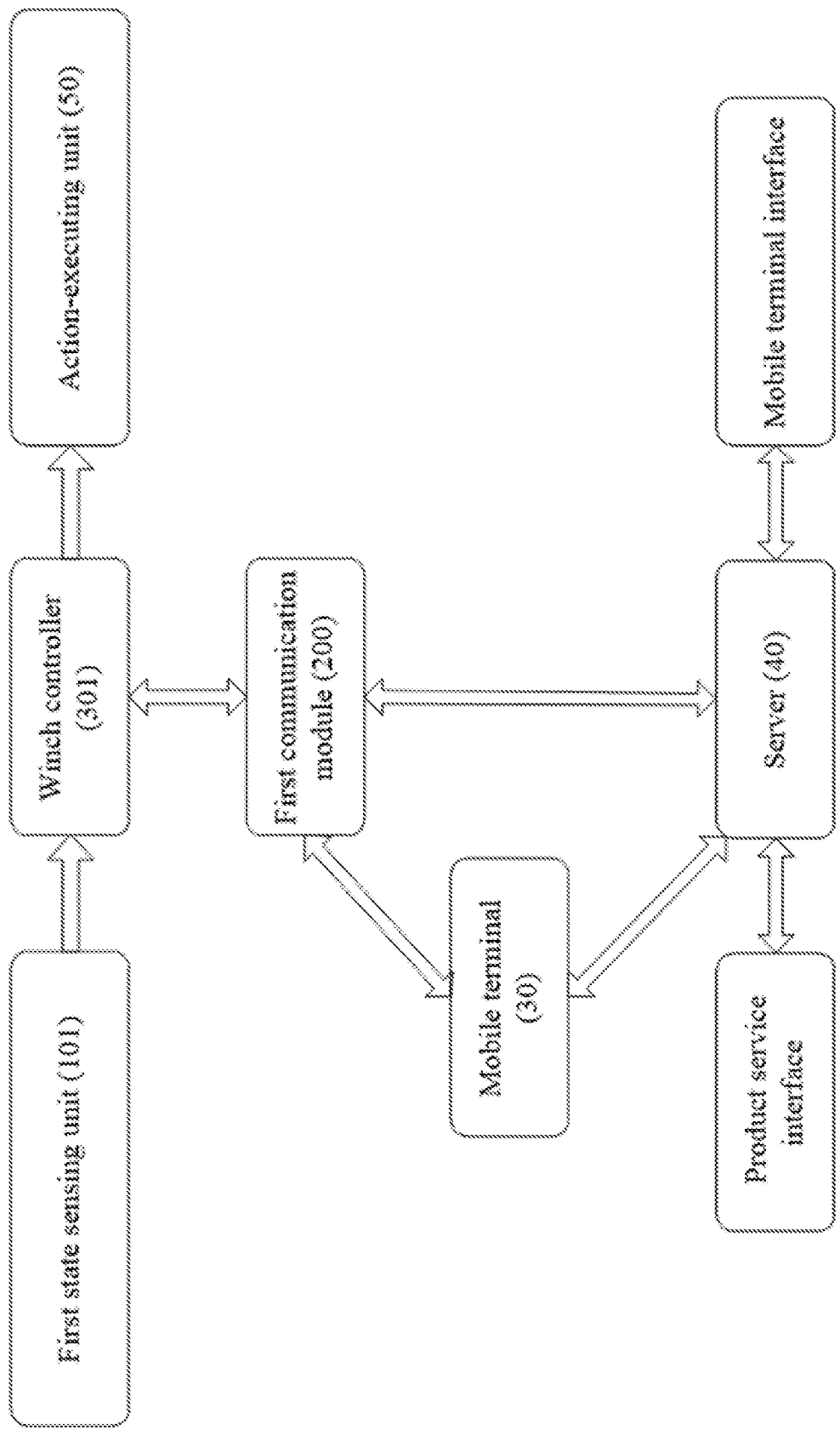
FIG. 2 is a schematic diagram illustrating a principle of a management apparatus for a vehicle device according to an embodiment of the present disclosure.
Figure 3:
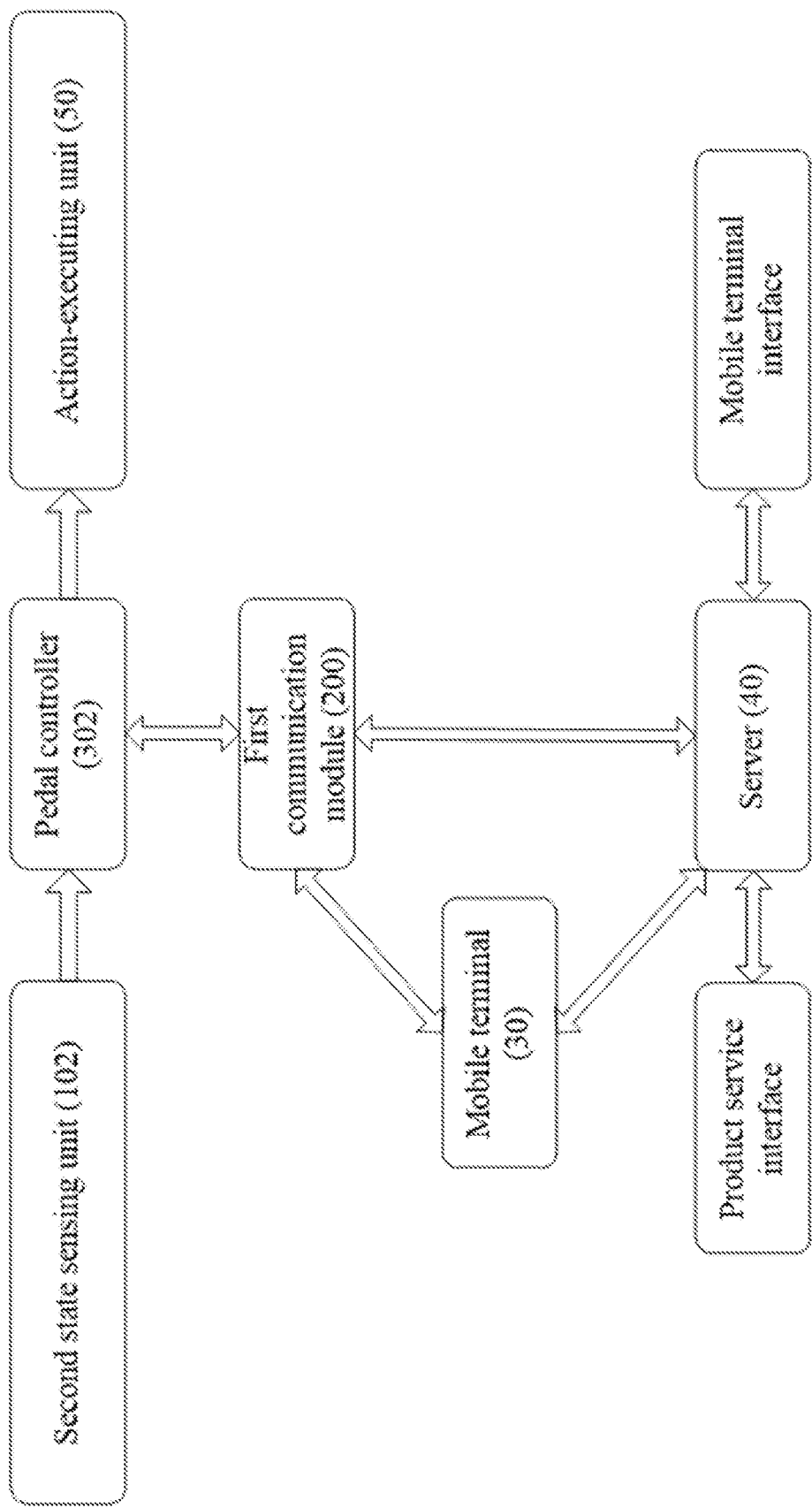
FIG. 3 is a schematic diagram illustrating a principle of a management apparatus for a vehicle device according to an embodiment of the present disclosure.

For example, as illustrated in FIGS. 2-3, if the user wants to learn information on the vehicle device 20, the user may collect pictures or videos of the vehicle device 20 and transmit them to the server 40 via the mobile terminal 30, or the user may directly and effectively submit a query in a voice mode. After receiving the request, the server 40 will transmit the relevant information on the vehicle device 20 or on the query the user submitted to the mobile terminal or the vehicle device 20. The relevant information may be visually displayed on a mobile terminal interface or a product service interface. In this way, timely and effective communication among the user, the mobile terminal, the server and the vehicle device will be achieved, thereby improving the user experience greatly.

In addition, the manufacturer of the vehicle device may communicate with the mobile terminal and/or the vehicle device via the server, so as to achieve the remote fault diagnosis, the remote product maintenance, and the remote product upgrade of the vehicle device, thereby improving the user experience greatly.

In an embodiment of the present disclosure, the state determining unit is configured to determine the current state of the vehicle device according to a current operating parameter of the vehicle device.

In an example embodiment of the present disclosure, as illustrated in FIG. 2, the state determining unit 100 includes a first state sensing unit 101. The first state sensing unit 101 is configured to determine a current state of a winch according to at least one of an operating current, current pulling force, current speed and current temperature of the winch.

For example, the first state sensing unit 101 may include a current sensing unit (e.g., a current sensor), a force sensing unit (e.g., a force sensor), a speed sensing unit (e.g., a speed sensor), or a temperature sensing unit (e.g., a temperature sensor), so as to detect the operating current, the current pulling force, the current speed or the current temperature of the winch, respectively, in real time, which is transmitted to the mobile terminal 30 or the server 40 via the first communication module 200, and based on which a control instruction may be input by the user or may be generated by the server, and then transmitted to an embodiment of the controller 300, e.g., winch controller 301, via the first communication module 200.

In an example embodiment of the present disclosure, as illustrated in FIG. 3, the state determining unit 100 includes a second state sensing unit 102. The second state sensing unit 102 is configured to determine a current state of a pedal according to at least one of an operating state and an operating current of the pedal.

For example, the second state sensing unit 102 may include an operating state sensing unit or an operating current sensing unit, so as to detect the operating state or the operating current of an electric stepping bar or the electric pedal, respectively, in real time, which is transmitted to the mobile terminal 30 or the server 40 via the first communication module 200, and based on which a control instruction may be input by the user or may be generated by the server, and then transmitted to an embodiment of the controller 300, e.g., pedal controller 302, via the first communication module 200.

Further, in the example embodiment as illustrated in FIG. 2, the controller 300 includes a winch controller 301. The winch controller 301 is configured to determine a target state of the winch according to the control instruction and control one or more actions of a winch driving device, an optical winch display device and an acoustic winch alerting device according to the target state of the winch.

For example, as illustrated in FIG. 2, after receiving the control instruction, the winch controller 301 determines the target state of the winch, so as to control the action-executing unit 50 to perform a corresponding action. In an embodiment, the target state of the winch may be a target current or a target pulling force of the winch, and controlling the action-executing unit 50 to perform a corresponding action may include controlling an engine of the winch to rotate so as to pull a target object. In an embodiment of the present disclosure, the action-executing unit 50 may also include a motor, a lamp, or a buzzer, etc., and controlling the action-executing unit 50 to perform a corresponding action may also include controlling the motor to increase a driving force, controlling the lamp to display different brightness or colors, or controlling the buzzer to give an alarm.

In an embodiment of the present disclosure, as illustrated in FIG. 3, the controller 300 includes a pedal controller 302. The pedal controller 302 is configured to determine a target state of the pedal according to the control instruction and control one or more actions of a pedal driving device, an optical pedal display device and an acoustic pedal alerting device according to the target state of the pedal.

Figure 4:
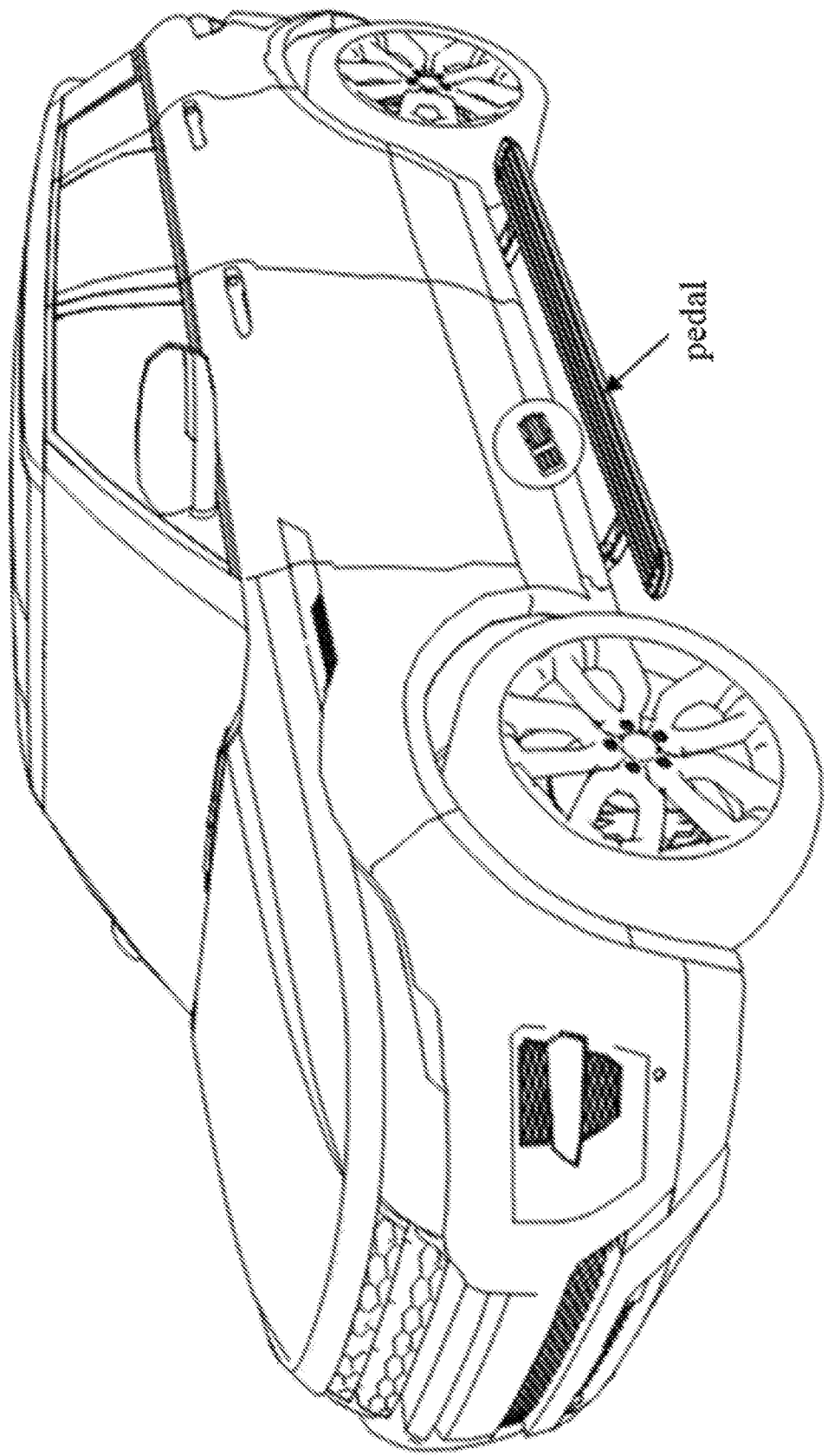
FIG. 4 is a schematic diagram of a vehicle according to an embodiment of the present disclosure.
Figure 5:
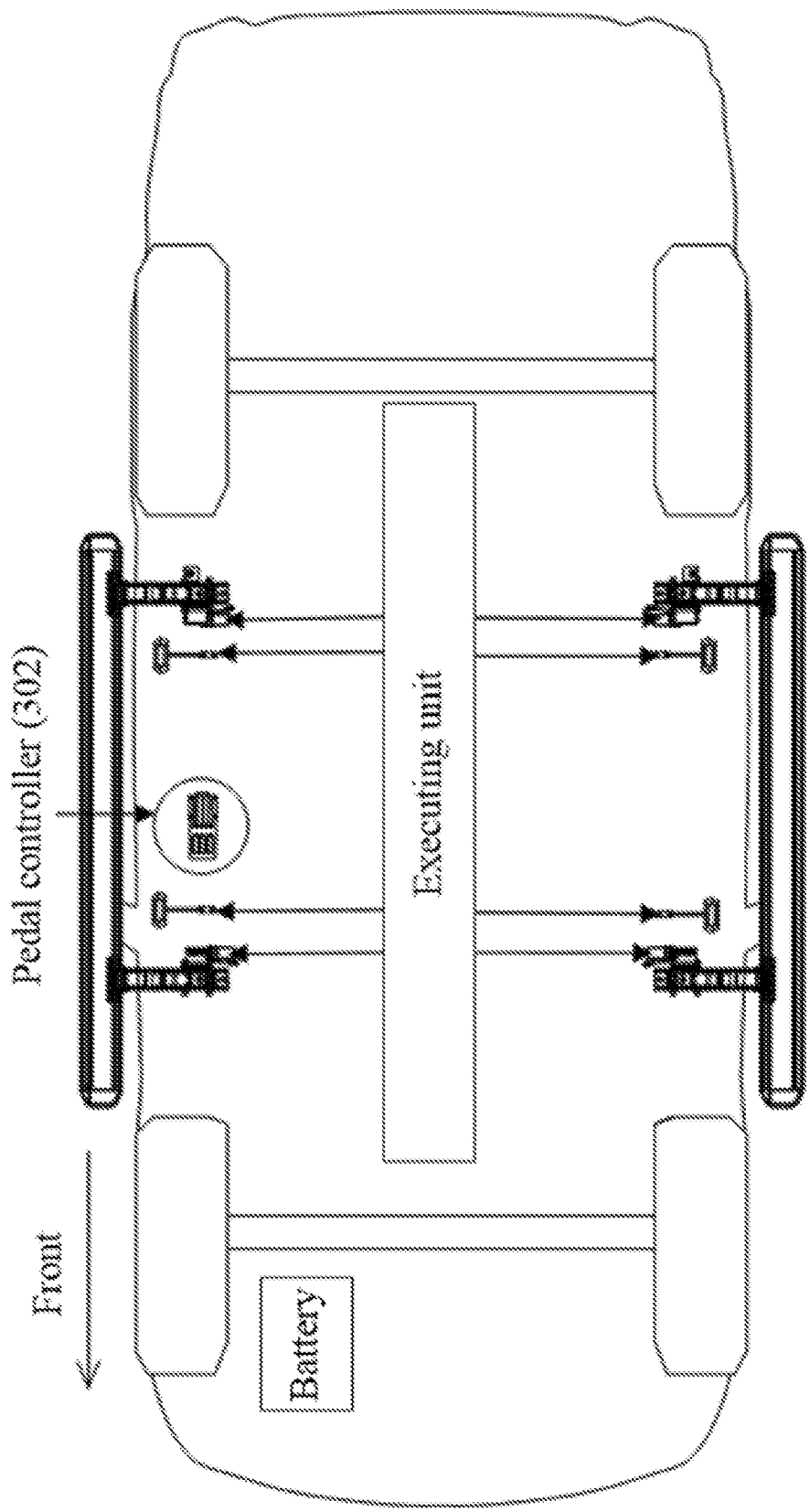
FIG. 5 is a schematic diagram of a vehicle according to an embodiment of the present disclosure.

For example, as illustrated in FIGS. 3-5, after receiving the control instruction, the pedal controller 302 determines the target state of the pedal, so as to control the action-executing unit 50 to perform a corresponding action. In an embodiment, the target state of the pedal may be an extended state or a contracted state, and controlling the action-executing unit 50 to perform a corresponding action may include controlling the pedal to extend or contract. In some embodiments, the action-executing unit 50 may also include a motor, a lamp, or a buzzer, etc., and controlling the action-executing unit 50 to perform a corresponding action may include controlling the motor to increase a driving force, controlling the lamp to display a current state of the pedal, or controlling the buzzer to give an alert.

It should be understood that, the electric pedal may include various kinds of telescoping mechanisms, such as a six-bar linkage, a five-bar linkage, or a four-bar linkage, etc., and may include a single-sided dual-motor driving solution or a single-side single-motor driving solution, which will not be elaborated herein.

Although the above examples are illustrated with respect to the electric pedal and the electric winch, it will be appreciated by those skilled in the art that any vehicle device 20 may be configured in a similar way.

Further, in an embodiment of the present disclosure, the management apparatus 10 further includes an environment determining module. The environment determining module is configured to determine a current vehicle condition.

In an embodiment of the present disclosure, the controller 300 is further configured to instruct the action-executing unit 50 of the vehicle device 20 not to respond to the control instruction when the current vehicle condition does not meet a preset condition.

It will be understood that, it may occasionally happen that the control instruction is accidentally triggered by the user when the vehicle is in a running condition. For example, an extension instruction of the pedal is accidentally triggered when the vehicle is running on a high-speed road. In such cases, the management apparatus 10 of the vehicle may intelligently determine whether the control instruction conforms to the current vehicle condition, and when the control instruction does not conform to the current vehicle condition, the controller of the management apparatus instructs the action-executing unit of the vehicle device not to respond to the control instruction, thereby avoiding the impact of the mis-triggered control instruction and ensuring driving safety.

In an embodiment, the preset condition may be set by those skilled in the art as required, which will not be specifically limited herein.

In embodiments of the present disclosure, the IoT technology is applied to the control of the vehicle device and imparts the function of intelligent interconnection to the vehicle device, based on which, the management apparatus for the vehicle device according to embodiments of the present disclosure is capable of transmitting the current state of the vehicle device to at least one of the mobile terminal and the server and receiving the control instruction from the at least one of the mobile terminal and the server, so as to control the vehicle device to execute an action corresponding to the received control instruction; functions for the remote fault diagnosis, the remote product maintenance, and the remote product upgrade of the vehicle device are effectively achieved; and the online after-sales service of the vehicle device is achieved by promoting the timely and effective communication among two or more of the user, the vehicle device, and the manufacturer of the vehicle device via texts, pictures, audios and videos, thereby making the vehicle more intelligent and automated, enhancing the practicability of the vehicle, achieving systematic, intelligent and networked management of the vehicle, effectively meeting usage demands, and improving user experiences.

In the following, a server according to embodiments of the present disclosure will be described in detail with reference to drawings.

Figure 6:
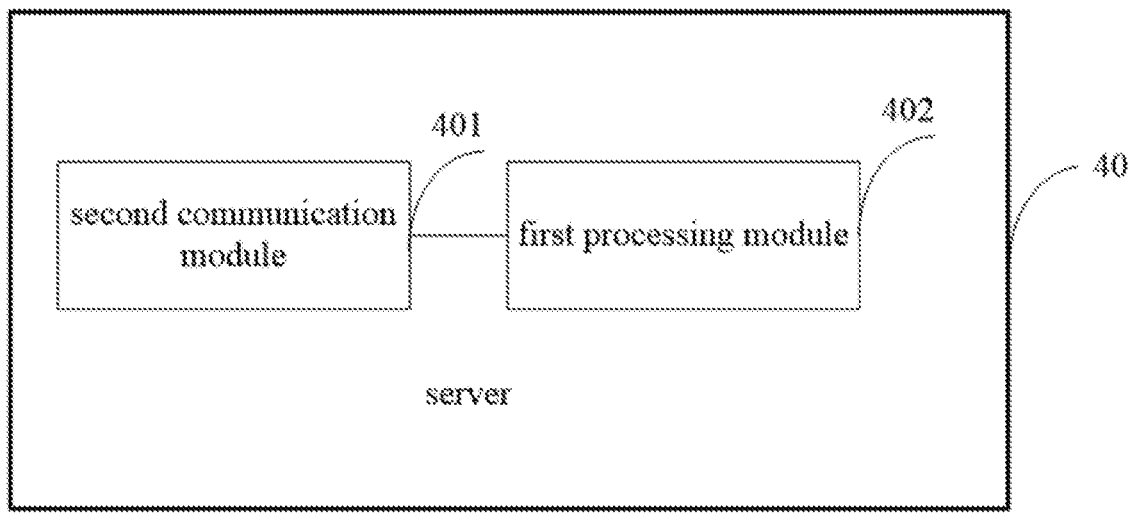
FIG. 6 is a block diagram of a server according to an embodiment of the present disclosure.

FIG. 6 is a block diagram of a server according to an embodiment of the present disclosure. As illustrated in FIG. 6, the server 40 includes a second communication module 401 and a first processing module 402.

The second communication module 401 is configured to receive a current state of a vehicle device transmitted from a management apparatus of the vehicle device or from a mobile terminal. The first processing module 402 is configured to generate a control instruction according to the current state of the vehicle device. The second communication module 401 is further configured to transmit the control instruction to the management apparatus of the vehicle device for driving the vehicle device to execute an action. The server according to embodiments of the present disclosure is capable of receiving the current state of the vehicle device, generating a control instruction according to the current state of the vehicle device, and transmitting the control instruction to the management apparatus of the vehicle device for driving the vehicle device to execute an action, thereby making the vehicle more intelligent and automated, enhancing the practicability of the vehicle, achieving systematic, intelligent and networked management of the vehicle, effectively meeting usage demands, and improving user experiences.

Further, in an embodiment of the present disclosure, the server 40 further includes a second processing module. The second processing module is configured to generate at least one of fault diagnosis information, device maintenance information and device upgrade information according to at least one of the current state and historical data of the vehicle device transmitted from at least one of the management apparatus of the vehicle device and the mobile terminal, so as to enable the management apparatus to perform a fault alert, device maintenance and device upgrade to the vehicle device according to the fault diagnosis information, the device maintenance information and the device upgrade information, respectively.

Further, in an embodiment of the present disclosure, the server 40 further includes a service module. The service module is configured to generate service information according to operating information of the vehicle device transmitted from at least one of the mobile terminal and the management apparatus of the vehicle device. In an embodiment of the present disclosure, the operating information includes at least one of text information, picture information, audio information and video information.

It should be understood that, the explanations and descriptions hereinbefore with respect to embodiments of a management apparatus for a vehicle device are also applicable to embodiments of the server, which will not be repeated herein.

In embodiments of the present disclosure, the IoT technology is applied to the control of the vehicle device and imparts the function of intelligent interconnection to the vehicle device, based on which, the server according to embodiments of the present disclosure is capable of receiving the current state of the vehicle device, generating a control instruction according to the current state of the vehicle device, and transmitting the control instruction to the management apparatus of the vehicle device for driving the vehicle device to execute an action; functions for the remote fault diagnosis, the remote product maintenance, and the remote product upgrade of the vehicle device are effectively achieved; and the online after-sales service of the vehicle device is achieved by promoting the timely and among two or more of the user, the vehicle device, and the manufacturer of the vehicle device via texts, pictures, audios and videos, thereby making the vehicle more intelligent and automated, enhancing the practicability of the vehicle, achieving systematic, intelligent and networked management of the vehicle, effectively meeting usage demands, and improving user experiences.

Further, embodiments of the present disclosure provide a vehicle, which includes the management apparatus of the vehicle device as described hereinbefore.

In embodiments of the present disclosure, the IoT technology is applied to the control of the vehicle device and imparts the function of intelligent interconnection to the vehicle device, based on which, the vehicle according to embodiments of the present disclosure is capable of transmitting the current state of the vehicle device to at least one of the mobile terminal and the server and receiving the control instruction from the at least one of the mobile terminal and the server, so as to control the vehicle device to execute an action corresponding to the received control instruction; functions for the remote fault diagnosis, the remote product maintenance, and the remote product upgrade of the vehicle device are effectively achieved; and the online after-sales service of the vehicle device is achieved by promoting the timely and effective communication among two or more of the user, the vehicle device, and the manufacturer of the vehicle device via texts, pictures, audios and videos, thereby making the vehicle more intelligent and automated, enhancing the practicability of the vehicle, achieving systematic, intelligent and networked management of the vehicle, effectively meeting usage demands, and improving user experiences.

In addition, terms such as "first" and "second" are used herein for purposes of description and are not intended to indicate or imply relative importance or significance. Thus, the feature defined with "first" and "second" may comprise one or more this feature. In the description of the present disclosure, the phrase of "a plurality of" means two or more than two, for example, two or three, unless specified otherwise.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

Although explanatory embodiments have been shown and described, it would be appreciated by those skilled in the art that the above embodiments are illustrative, cannot be construed to limit the present disclosure, and changes, alternatives, and modifications can be made in the embodiments without departing from spirit, principles and scope of the present disclosure.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A management apparatus for a vehicle device, comprising:
    a state determining unit, configured to determine a current state of the vehicle device;
    a first communication module, configured to transmit the current state of the vehicle device to at least one of a mobile terminal or a server, and to receive a control instruction generated by the at least one of the mobile terminal or the server according to the current state of the vehicle device; and
    a controller, configured to control an action-executing unit of the vehicle device according to the control instruction to drive the vehicle device to execute an action;
    wherein the controller comprises:
        a pedal controller, configured to determine a target state of a pedal mounted below a door of a vehicle according to the control instruction and to control one or more actions of a pedal driving device, an optical pedal display device, and an acoustic pedal alerting device according to the target state of the pedal,
    wherein the target state of the pedal comprises an extension state or a contraction state,
    wherein the state determining unit comprises a pedal state sensing unit, configured to determine a current state of the pedal according to at least one of an operating state or an operating current of the pedal, and
    wherein, if the operating state of the pedal is inconsistent with the operating current of the pedal, it is determined that a fault occurs to the pedal.

2. The management apparatus according to claim 1, wherein the first communication module is further configured to receive at least one of fault diagnosis information, device maintenance information, or device upgrade information generated by the at least one of the mobile terminal or the server according to at least one of the current state or historical data of the vehicle device, and
    the controller is further configured to control a fault alert, device maintenance and device upgrade of the vehicle device according to the fault diagnosis information, the device maintenance information and the device upgrade information, respectively.

3. The management apparatus according to claim 1, further comprising:
    a collecting unit, configured to collect operating information of the vehicle device and to transmit the operating information to the at least one of the mobile terminal or the server via the first communication module for generation of service information, wherein the operating information comprises at least one of picture information, audio information, or video information.

4. The management apparatus according to claim 1, wherein the state determining unit is further configured to determine the current state of the vehicle device according to a current operating parameter of the vehicle device.

5. The management apparatus according to claim 3, wherein the operating information comprises text information.

6. The management apparatus according to claim 1, wherein the state determining unit further comprises:
    a winch state sensing unit, configured to determine a current state of a winch according to at least one of an operating current, current pulling force, current speed, or current temperature of the winch.

7. The management apparatus according to claim 6, wherein the controller comprises:
    a winch controller, configured to determine a target state of the winch according to the control instruction and control one or more actions of a winch driving device, an optical winch display device and an acoustic winch alerting device according to the target state of the winch.

8. The management apparatus according to claim 1, further comprising an environment determining module, configured to determine a current vehicle condition,
    wherein the controller is further configured to instruct the action-executing unit of the vehicle device not to respond to the control instruction when the current vehicle condition does not meet a preset condition.

9. The management apparatus according to claim 1, wherein the pedal controller is further configured to instruct the pedal not to respond to an extension instruction when the vehicle is running on a high-speed road.

10. The management apparatus according to claim 1, wherein the management apparatus is configured to:
    receive an upgrade package from the server;
    determine whether the upgrade package meets an upgrade condition; and upgrade a system of the vehicle device when the upgrade package meets the upgrade condition.

11. A vehicle, comprising a management apparatus for a vehicle device, comprising:
a state determining unit, configured to determine a current state of the vehicle device according to a current operating parameter of the vehicle device;
a first communication module, configured to transmit the current state of the vehicle device to at least one of a mobile terminal or a server, and to receive a control instruction generated by the at least one of the mobile terminal or the server according to the current state of the vehicle device; and
a controller, configured to control an action-executing unit of the vehicle device according to the control instruction to drive the vehicle device to execute an action; and
a pedal mounted below a door of the vehicle;
wherein the controller comprises:
a pedal controller, configured to determine a target state of the pedal according to the control instruction and to control one or more actions of a pedal driving device, an optical pedal display device, and an acoustic pedal alerting device according to the target state of the pedal,
wherein the target state of the pedal comprises an extension state or a contraction state,
wherein the state determining unit comprises a pedal state sensing unit, configured to determine a current state of the pedal according to at least one of an operating state or an operating current of the pedal, and
wherein if the operating state of the pedal is inconsistent with the operating current of the pedal, it is determined that a fault occurs to the pedal.

12. The vehicle according to claim 11, wherein the first communication module is further configured to receive at least one of fault diagnosis information, device maintenance information, or device upgrade information generated by the at least one of the mobile terminal or the server according to at least one of the current state or historical data of the vehicle device, and
the controller is further configured to control a fault alert, device maintenance, or device upgrade of the vehicle device according to the fault diagnosis information, the device maintenance information, and the device upgrade information, respectively.

13. The vehicle according to claim 11, wherein the management apparatus further comprises:
a collecting unit, configured to collect operating information of the vehicle device and to transmit the operating information to the at least one of the mobile terminal or the server via the first communication module for generation of service information, and
the operating information comprises at least one of text information, picture information, audio information, or video information.

14. The vehicle according to claim 11, wherein the state determining unit further comprises:
a winch state sensing unit, configured to determine a current state of a winch according to at least one of an operating current, current pulling force, current speed, or current temperature of the winch.

15. The vehicle according to claim 14, wherein the controller comprises:
a winch controller, configured to determine a target state of the winch according to the control instruction and control one or more actions of a winch driving device, an optical winch display device, or an acoustic winch alerting device according to the target state of the winch.

16. The vehicle according to claim 11, wherein the management apparatus further comprises an environment determining module configured to determine a current vehicle condition, and the controller is further configured to instruct the action-executing unit of the vehicle device not to respond to the control instruction when the current vehicle condition does not meet a preset condition.

17. The vehicle according to claim 11, wherein the pedal controller is further configured to instruct the pedal not to respond to an extension instruction when the vehicle is running on a high-speed road.

18. The vehicle according to claim 11, wherein the management apparatus is configured to:
receive an upgrade package from the server;
determine whether the upgrade package meets an upgrade condition; and
upgrade a system of the vehicle device when the upgrade package meets the upgrade condition.

19. A server, comprising:
a processor; and
a memory coupled to the processor and having stored therein instructions executable by the processor,
wherein the processor is configured to:
receive a current state of a vehicle device transmitted from a management apparatus of the vehicle device or from a mobile terminal; and
generate a control instruction according to the current state of the vehicle device,
transmit the control instruction to the management apparatus of the vehicle device for determining a target state of a pedal mounted below a door of a vehicle according to the control instruction and controlling one or more actions of a pedal driving device, an optical pedal display device, and an acoustic pedal alerting device according to the target state of the pedal,
wherein the target state of the pedal comprises an extension state or a contraction state,
wherein the processor is further configured to:
receive an operating state and an operating current of the pedal from the management apparatus of the vehicle device, and
determine that a fault occurs to the pedal if the operating state of the pedal is inconsistent with the operating current of the pedal.

20. The server according to claim 19, wherein the processor is configured to:
generate at least one of fault diagnosis information, device maintenance information, or device upgrade information according to at least one of the current state or historical data of the vehicle device transmitted from at least one of the management apparatus of the vehicle device or the mobile terminal, so as to enable the management apparatus to perform a fault alert, device maintenance, or device upgrade to the vehicle device according to the fault diagnosis information, the device maintenance information, and the device upgrade information, respectively.

21. The server according to claim 19, wherein the processor is configured to:
generate service information according to operating information of the vehicle device transmitted from at least one of the mobile terminal or the management apparatus of the vehicle device, wherein the operating information comprises at least one of text information, picture information, audio information, or video information.

\* \* \* \* \*